(12) United States Patent
Takemoto et al.

(10) Patent No.: US 7,660,467 B2
(45) Date of Patent: Feb. 9, 2010

(54) IMAGE EXTRACTING APPARATUS, IMAGE EXTRACTING METHOD, AND IMAGE EXTRACTING PROGRAM

(75) Inventors: Fumito Takemoto, Kanagawa (JP); Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 727 days.

(21) Appl. No.: 11/366,478

(22) Filed: Mar. 3, 2006

(65) Prior Publication Data

US 2006/0210166 A1 Sep. 21, 2006

(30) Foreign Application Priority Data

Mar. 3, 2005 (JP) .............................. 2005-059429
Feb. 23, 2006 (JP) .............................. 2006-047320

(51) Int. Cl.
*G06K 9/46* (2006.01)

(52) U.S. Cl. ........................ 382/190; 382/195; 382/199; 382/204; 382/307

(58) Field of Classification Search ................ 382/190, 382/195, 199, 204, 307
See application file for complete search history.

(56) References Cited

U.S. PATENT DOCUMENTS 5,587,762 A * 12/1996 Watanabe .................... 396/95
5,860,032 A * 1/1999 Iwane .......................... 396/95

FOREIGN PATENT DOCUMENTS

JP 6-165009 A 6/1994

* cited by examiner

*Primary Examiner*—Anand Bhatnagar
*Assistant Examiner*—Mike Rahmjoo
(74) *Attorney, Agent, or Firm*—Birch, Stewart, Kolasch & Birch, LLP

(57) ABSTRACT

An album creating apparatus according to the present invention includes an object extracting section that extracts an object from a moving image, an object acceleration computing section that computes acceleration of the object extracted from the object extracting section to a background based on a change of position in a plurality of continuous moving-image constituting images, a timing specifying section that specifies a timing in which the acceleration computed from the object acceleration computing section is larger than a predetermined reference acceleration, and a representative image extracting section that extracts a moving-image constituting image included in a predetermined time range centered on the timing specified by the timing specifying section as a representative image.

11 Claims, 10 Drawing Sheets

IMAGE EXTRACTING APPARATUS, IMAGE EXTRACTING METHOD, AND IMAGE EXTRACTING PROGRAM

CROSS REFERENCE TO RELATED APPLICATION

The present application claims priority from Japanese Patent Applications:
No. 2005-059429 filed on Mar. 3, 2005, and
NO. 2006-047320 filed on Feb. 23, 2006, the contents of which are incorporated herein by reference.

BACKGROUND OF THE INVENTION

1. Field of the Invention

The present invention relates to an image extracting apparatus, an image extracting method, and an image extracting program. More particularly, the present invention relates to an image extracting apparatus, an image extracting method, and an image extracting program for extracting a moving-image constituting image to be output as a still image from moving images including a plurality of moving-image constituting images.

2. Related Art

Conventionally, a state of a captured moving-image constituting image is estimated from button grabbing by a user such as setting of an angle of view or a zoom for a video camera. Further, a method for automatically determining priority when displaying a digest for moving-image constituting images based on the estimated state of moving-image constituting image is proposed as disclosed, for example, in Japanese Patent Application Publication No. 1994-165009.

However, the priority of moving-image constituting image displayed in the digest is determined regardless of the state of subject taken really. Therefore, there has been a problem that it is difficult to appropriately output a moving-image constituting image, which a user wants to appreciate truly, among moving-image constituting images that have been taken.

SUMMARY OF THE INVENTION

Therefore, it is an object of the present invention to provide an image extracting apparatus, an image extracting method, and an image extracting program that can solve the foregoing problems. The above and other objects can be achieved by combinations described in the independent claims. The dependent claims define further advantageous and exemplary combinations of the present invention.

That is, according to the first aspect of the present invention, there is provided an image extracting apparatus that extracts a candidate image to be output as a representative image from a plurality of candidate images. The image extracting apparatus includes: an object extracting section that extracts an object from candidate images arranged in time series; an object acceleration computing section that computes acceleration of each object of the plurality of candidate images to a background based on a change of position of the object extracted from the object extracting section in the plurality of candidate images arranged in time series; and a representative image extracting section that extracts, as a representative image, a candidate image including an object in which the acceleration computed from the object acceleration computing section is larger than predetermined reference acceleration. Moreover, the candidate image may be a moving-image constituting image included in a moving image, the image extracting apparatus may further include a timing specifying section that specifies a timing in which the acceleration of the object extracted by the object extracting section from the moving-image constituting images to the background, which is computed from the object acceleration computing section, is larger than the predetermined reference acceleration based on a change of position in the plurality of continuous moving-image constituting images included in the moving image, and the representative image extracting section may extract a moving-image constituting image included in a predetermined time range centered on the timing specified by the timing specifying section as a representative image.

Moreover, the timing specifying section may specify a timing in which the acceleration computed from the object acceleration computing section is the largest, and the representative image extracting section may extract, as a representative image, a moving-image constituting image included in a predetermined time range centered on the timing specified by the timing specifying section, in which the acceleration of the object is the largest. In addition, the representative image extracting section may extract, as a representative image, a moving-image constituting image taken in the timing specified by the timing specifying section, in which the acceleration of the object is the largest. Further, the object-extracting section may extract a plurality of objects from the moving image, the object acceleration computing section may respectively compute acceleration of the plurality of objects extracted from the object extracting section, the timing specifying section may specify a timing in which the acceleration computed from the object acceleration computing section is larger than a predetermined reference speed, for each of the plurality of objects extracted from the object extracting section, and the representative image extracting section may extract a moving-image constituting image included in a predetermined time range centered on the timing specified by the timing specifying section as a representative image, for each of the plurality of objects extracted from the object extracting section.

Further, the timing specifying section may specify a timing in which acceleration of an object having a largest area in the moving-image constituting image is the largest among the plurality of objects extracted from the object extracting section, and the representative image extracting section may respectively extract a moving-image constituting image included in the predetermined time range centered on the timing specified by the timing specifying section, in which the acceleration of the object having a largest area is the largest, as a representative image. In addition, the image extracting apparatus may further include a template storing section that stores a template for an output area for which an image arrangement position and acceleration range information showing a range of acceleration of an object included in a representative image to be arranged in the image arrangement position are predetermined, and the representative image extracting section may extract, as a representative image, a candidate image of which acceleration of an object is within the range of acceleration of object shown by the acceleration range information associated with the image arrangement position included in the template stored on the template storing section.

Moreover, the image extracting apparatus may further include a template storing section that stores a template for an output area for which a first representative image arrangement position at which a first representative image should be arranged and a second representative image arrangement position at which a second representative image should be arranged are predetermined, and the representative image extracting section may include: a first representative image extracting section that extracts the first representative image to be arranged at the first representative image arrangement position; an acceleration determining section that determines acceleration of an object included in the second representative image to be arranged at the second representative image arrangement position according to acceleration of an object included in the first representative image extracted from the first representative image extracting section; and a second representative image extracting section that extracts the second representative image based on the acceleration of object determined by the acceleration determining section. Further, the template storing section may store a template for an output area for which the second representative image arrangement position and relative acceleration that is acceleration of object determined relatively to the acceleration of object included in the first representative image are predetermined, and the acceleration determining section may determine the acceleration of object included in the second representative image to be arranged at the second representative image arrangement position based on the acceleration of object included in the first representative image extracted from the first representative image extracting section and the relative acceleration of object stored on the template storing section.

Moreover, according to the second aspect of the present invention, there is provided an image extracting method for extracting a candidate image to be output as a representative image from a plurality of candidate images. The image extracting method includes: an object extracting step of extracting an object from candidate images arranged in time series; an object acceleration computing step of computing acceleration of each object of the plurality of candidate images to a background based on a change of position of the object extracted in the object extracting step in the plurality of candidate images arranged in time series; and a representative image extracting step of extracting, as a representative image, a candidate image including an object in which the acceleration computed in the object acceleration computing step is larger than predetermined reference acceleration.

Moreover, according to the third aspect of the present invention, there is provided an image extracting program for an image extracting apparatus that extracts a candidate image to be output as a representative image from a plurality of candidate images. The program makes the image extracting apparatus function as: an object extracting section that extracts an object from candidate images arranged in time series; an object acceleration computing section that computes acceleration of each object of the plurality of candidate images to a background based on a change of position of the object extracted from the object extracting section in the plurality of candidate images arranged in time series; and a representative image extracting section that extracts, as a representative image, a candidate image including an object in which the acceleration computed from the object acceleration computing section is larger than predetermined reference acceleration.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
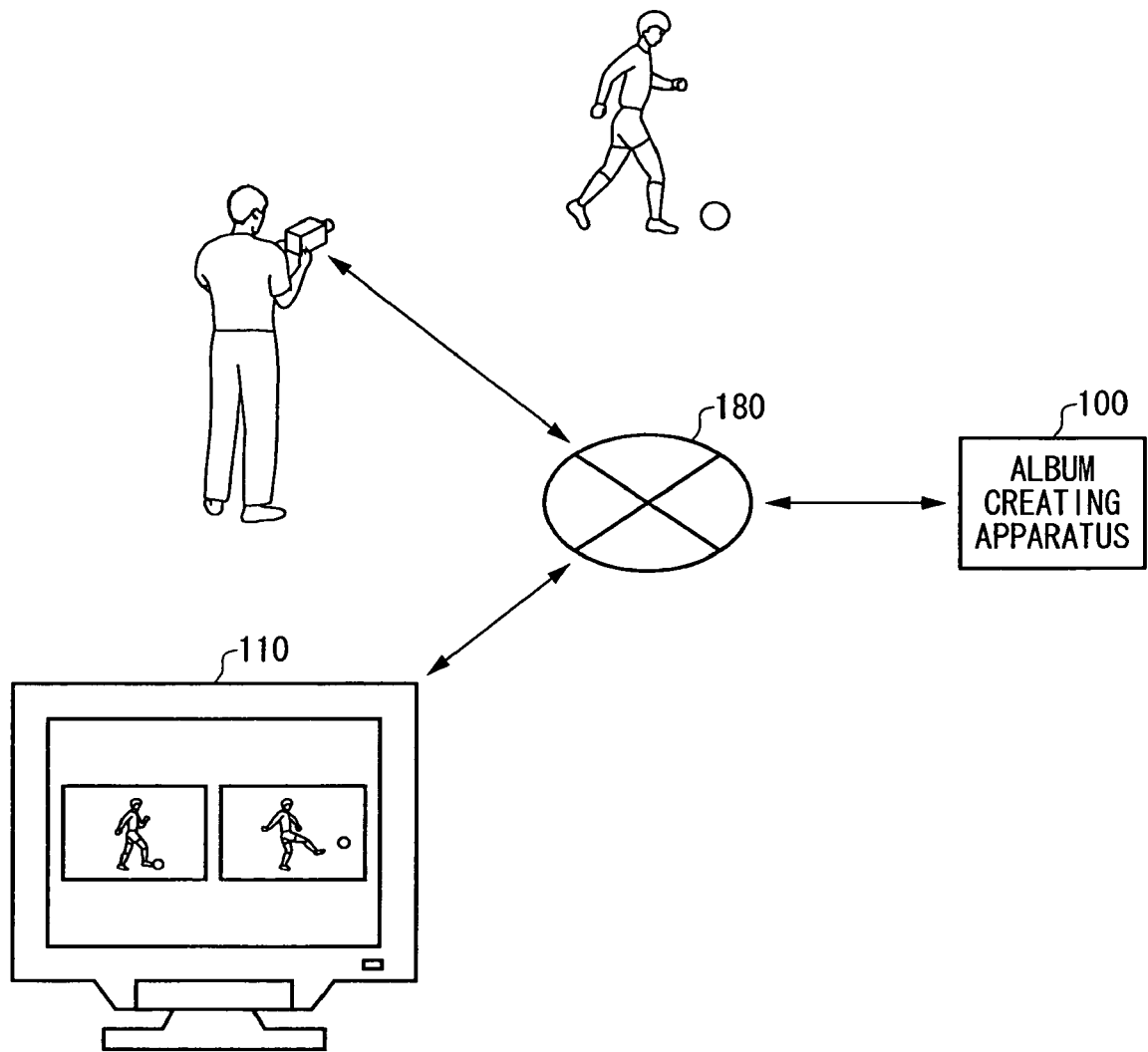
FIG. 1 is a view showing a use environment of an album creating apparatus 100.

FIG. 1 is a view exemplary showing a use environment of an album creating apparatus 100 according to an embodiment of the present invention. The album creating apparatus 100 and a photo stand 110 are examples of an image extracting apparatus according to the present invention. The album creating apparatus 100 receives a plurality of candidate images via a network 180. In addition, a candidate image may be a still image or a moving-image constituting image included in a moving image. Moreover, a moving-image constituting image may be either of various types of images constituting a frame image, a field image, and other moving images. Then, the album creating apparatus 100 extracts a candidate image to be output as a representative image from the plurality of candidate images to make an album.

Specifically, the album creating apparatus 100 extracts an object from a moving image to compute acceleration of the object to a background. Then, the album creating apparatus 100 extracts a plurality of moving-image constituting images as a representative image with a central focus on a timing in which the acceleration of object is larger than a predetermined value. Here, a representative image means a moving-image constituting image that is a material of an album such as an image for dressing a cover of an album, an image to be significantly arranged at a center of a page of an album, or an image to be used for a background of the whole of a page of an album. Moreover, a representative image may be an image to be significantly displayed at a center of a display apparatus such as the photo stand 110 or an image to be emphatically displayed on a display apparatus.

For example, the album creating apparatus 100 extracts a moving-image constituting image including an object having the largest acceleration as a representative image, among the plurality of extracted moving-image constituting images. Moreover, the album creating apparatus 100 may extract a plurality of moving-image constituting images as a representative image with a central focus on the moving-image constituting image including the object having the largest acceleration.

After extracting a representative image, the album creating apparatus 100 lays out the representative image to make an album. Moreover, the album creating apparatus 100 may make an album by laying out a plurality of representative images. Furthermore, the album creating apparatus 100 may use a representative image as a typical image of an album and images except the representative image as a subordinate image, in order to make the album.

For example, when a user takes a game of soccer, it is considered that the user takes a shooting moment of a player. In this case, the acceleration of ball at a shot moment is the largest. Therefore, the album creating apparatus 100 extracts a moving-image constituting image in which a ball at a shot moment is taken as a representative image, in order to make an album. Moreover, the album creating apparatus 100 may extract, as a representative image, a plurality of moving-image constituting images taken within a predetermined time range with a central focus on the moving-image constituting image in which the ball at the shot moment is taken, in order to make an album.

Moreover, as another example, the album creating apparatus 100 displays a representative image longer than other moving-image constituting images on a display apparatus such as the photo stand 110. Furthermore, when a plurality of moving-image constituting images including a representative image is displayed on the same screen, the album creating apparatus 100 may significantly display the representative image at a center of a display apparatus such as the photo stand 110 or blink on and off the representative image to emphatically display the representative image.

An object of the album creating apparatus 100 according to the present embodiment is to extract a representative image at a crucial moment, which a user wants to appreciate, from a plurality of candidate images.

Figure 2:
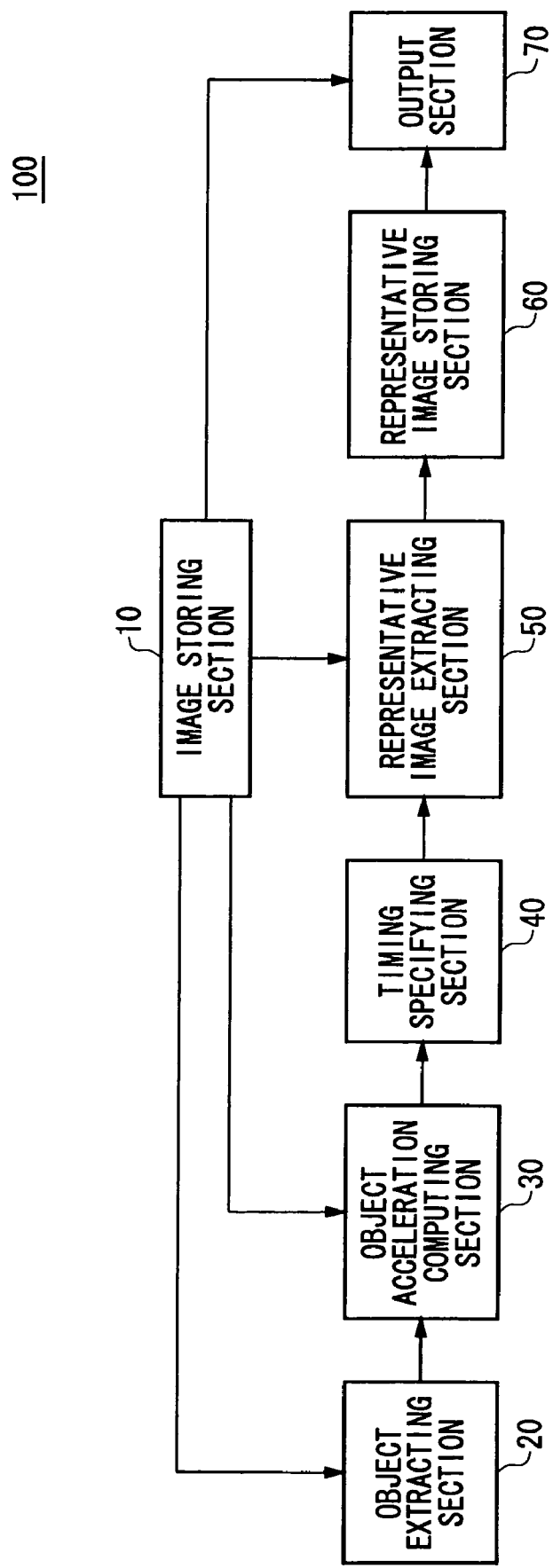
FIG. 2 is a block diagram showing a functional configuration of an album creating apparatus 100.

FIG. 2 is a view exemplary showing a functional configuration of the album creating apparatus 100 according to the present embodiment. The album creating apparatus 100 includes an image storing section 10, an object extracting section 20, an object acceleration computing section 30, a timing specifying section 40, a representative image extracting section 50, a representative image storing section 60, and an output section 70. The image storing section 10 stores a still image or a moving image as a candidate image to be output as a representative image. For example, a still image may be continuous shots. Moreover, a moving image may consist of a plurality of moving-image constituting images. Moreover, the image storing section 10 may attach composition information that is information showing contents of a candidate image to the candidate image and store the candidate image. For example, the image storing section 10 may store information related to acceleration of an object included in a candidate image in association with the candidate image as composition information, along with the candidate image. The object extracting section 20 receives a plurality of candidate images from the image storing section 10, and extracts an object from the candidate images arranged in time series. When a candidate image is a moving image, the object extracting section 20 receives moving-image constituting images from the image storing section 10, and extracts an object from the moving-image constituting images. For example, the object extracting section 20 extracts an object from moving-image constituting images that constitutes a moving image by an image processing such as an outline extracting process or a color distribution analyzing process.

The object acceleration computing section 30 computes acceleration of each object of the plurality of candidate images to a background based on a change of position of the object extracted from the object extracting section 20 in the plurality of candidate images arranged in time series. For example, when a candidate image is a still image and a still image is taken in a predetermined timing, a plurality of preliminary images may be acquired within a predetermined time range including the timing. Then, the image storing section 10 may store the plurality of preliminary images in association with a still image when the still image is taken. Based on a change of position of an object in the still image including the object extracted from the object extracting section 20 and the plurality of preliminary images stored on the image storing section 10 in association with the still image, the object acceleration computing section 30 computes acceleration of the object in the taken timing.

Moreover, when a candidate image is moving-image constituting images that constitute a moving image, the object acceleration computing section 30 receives the object extracted from the object extracting section 20 and the moving-image constituting images stored on the image storing section 10. Then, the object acceleration computing section 30 computes acceleration of the object extracted from the object extracting section 20 to a background based on a change of position of the extracted object in the plurality of continuous moving-image constituting images. Then, the object acceleration computing section 30 supplies the acceleration of the computed object to the timing specifying section 40. The timing specifying section 40 specifies a timing in which the acceleration computed from the object acceleration computing section 30 is larger than predetermined reference acceleration. In addition, reference acceleration may be set to a different value according to circumstances of the object included in the taken moving-image constituting images. For example, when a user takes baseball, reference acceleration is set so that a moving-image constituting image at the moment when a bat hits a ball can be extracted. Moreover, when a user takes an athletic meeting, reference acceleration may be set so that a moving-image constituting image at the moment, e.g., when a player starts in a relay race can be extracted.

The representative image extracting section 50 extracts a candidate image including an object in which the acceleration computed from the object acceleration computing section 30 is larger than the predetermined reference acceleration as a representative image. Specifically, when a candidate image is a moving-image constituting image, a moving-image constituting image corresponding to the timing specified by the timing specifying section 40 may be a representative image. Moreover, the representative image extracting section 50 receives the moving-image constituting images from the image storing section 10, and extracts moving-image constituting images within a predetermined time range centered on the timing specified by the timing specifying section 40 as a representative image. In addition, the representative image extracting section 50 may set the time range based on when the acceleration begins to increase, when the acceleration begins to decrease, when the acceleration stops increasing, or when the acceleration stops decreasing. For example, the time range from the start of the increase of acceleration of object to the stop of the decrease of acceleration through the stop of the increase of acceleration and the start of the decrease of acceleration may be set as a time range extracting a representative image.

The representative image extracted by the representative image extracting section 50 is stored on the representative image storing section 60. Then, the representative image storing section 60 supplies the stored representative image to the output section 70. The output section 70 outputs the representative image received from the representative image storing section 60 and the moving-image constituting image received from the image storing section 10. For example, the output section 70 is a printer for printing an album in which a representative image is laid out. Moreover, the output section 70 may be a display apparatus for displaying a representative image on the photo stand 110 or the like. The output section 70 may further record an album in which a representative image is laid out in a recording medium such as DVD.

According to the album creating apparatus 100 according to the present embodiment, a representative image can be automatically extracted with a central focus on a timing in which the acceleration of object included in moving-image constituting images of a moving image is larger than the predetermined reference acceleration. In this way, it is possible to extract a representative image at the crucial moment, which a user truly wants to appreciate.

Figure 3:
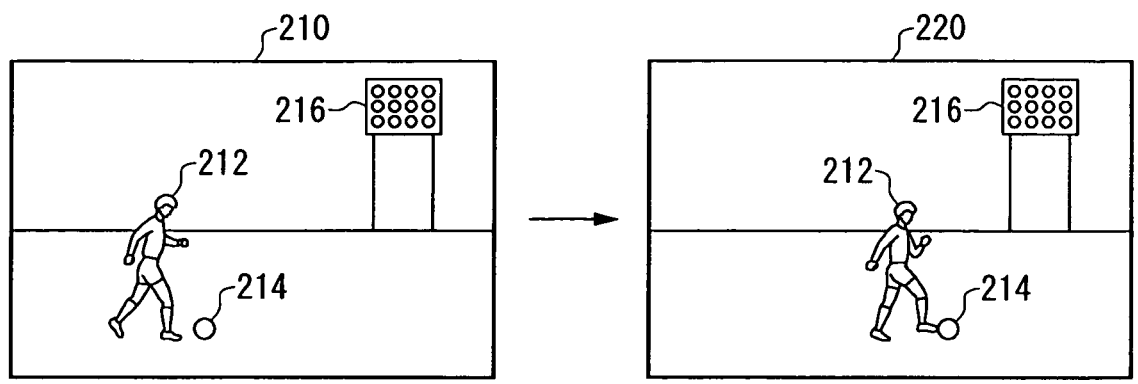
FIG. 3 is a view showing a computation method of acceleration by an object acceleration computing section 30.
Figure 3:
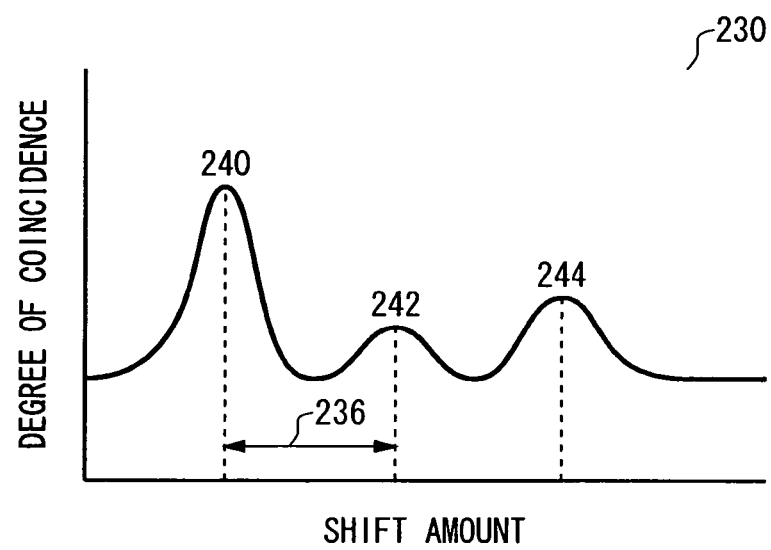

FIG. 3 is a view exemplary showing a computation method of acceleration by the object acceleration computing section 30. The object acceleration computing section 30 overlaps and matches the plurality of continuous moving-image constituting images for the object extracted from the object extracting section 20 while changing a shift amount. Then, the object acceleration computing section 30 computes a degree of coincidence between the moving-image constituting images every predetermined shift amount. Here, a shift amount shows an amount by which the moving-image constituting images are overlapped with each other. The user may freely set a shift amount. Moreover, a degree of coincidence shows a ratio of a matched area of a background and an object in the moving-image constituting images to an area of the overlapped moving-image constituting images.

For example, the object acceleration computing section 30 overlaps and matches moving-image constituting images while shifting the moving-image constituting images from an end of a moving-image constituting image 210 in a longitudinal direction of a moving-image constituting image 220. Then, the object acceleration computing section 30 judges that a peak 240 having the greatest degree of coincidence is a point where a background of the moving-image constituting image 210 is identical with a background of the moving-image constituting image 220, in a graph 230. Since a ratio of an area occupied by a background to a moving-image constituting image is usually maximum, a degree of coincidence between moving-image constituting images may be maximum when backgrounds are identical with each other.

Moreover, the object acceleration computing section 30 judges that other peaks, except the peak 240 where a degree of coincidence becomes maximum, are peaks showing points where objects included in the moving-image constituting image 210 and the moving-image constituting image 220 are identical with each other. Because an area ratio of an object included in a moving-image constituting image to the moving-image constituting image is usually smaller than an area ratio of a background to the moving-image constituting image, it is judged that other peaks, except a peak having the maximum degree of coincidence, are peaks showing points where objects are identical with each other. Therefore, peaks 242 and 244 except the peak 240 having the maximum degree of coincidence are peaks showing points where objects are identical with each other. Then, since an area ratio of a ball 214 to a background is smaller than that of a soccer player 212, the object acceleration computing section 30 judges that a point corresponding to the peak 242 is a point where the balls 214 included in the moving-image constituting image 210 and the moving-image constituting image 220 are identical with each other, from the graph 230.

Then, it is assumed that the difference between the peak 240 corresponding to the point where the backgrounds are identical with each other and the peak 242 corresponding to the point where the balls 214 are identical with each other, which are judged by the object acceleration computing section 30, is a distance 236 of the ball 214 to the background. In this way, a moving speed of the ball 214 can be computed based on a frame period and the distance 236 of the ball 214 to the background computed from the object acceleration computing section 30. In addition, a direction for matching moving-image constituting images while shifting the moving-image constituting images is not limited to the direction described above. The object acceleration computing section 30 may shift and match the moving-image constituting images for each predetermined shift amount along a longitudinal direction or a transverse direction of the moving-image constituting image. Moreover, the object acceleration computing section 30 may simultaneously change a predetermined shift amount in a longitudinal direction and a transverse direction, in order to shift and match the moving-image constituting images.

Moreover, in another example, the object acceleration computing section 30 may superimpose a plurality of continuous moving-image constituting images on the extracted moving-image constituting image to match the moving-image constituting images. The object acceleration computing section 30 may extract an area not matched in a matching operation as a moving object. Further, the object acceleration computing section 30 may compute a moving speed of the extracted object based on a frame period and a moving distance of the object. Then, after a moving speed of each object of each moving-image constituting image is computed, the object acceleration computing section 30 computes acceleration of each object included in the moving-image constituting images by differentiating the computed moving speed. Then, the acceleration of each object computed from the object acceleration computing section 30 is supplied to the timing specifying section 40. The timing specifying section 40 specifies a timing in which the acceleration computed from the object acceleration computing section 30 is larger than predetermined reference acceleration.

Figure 4:
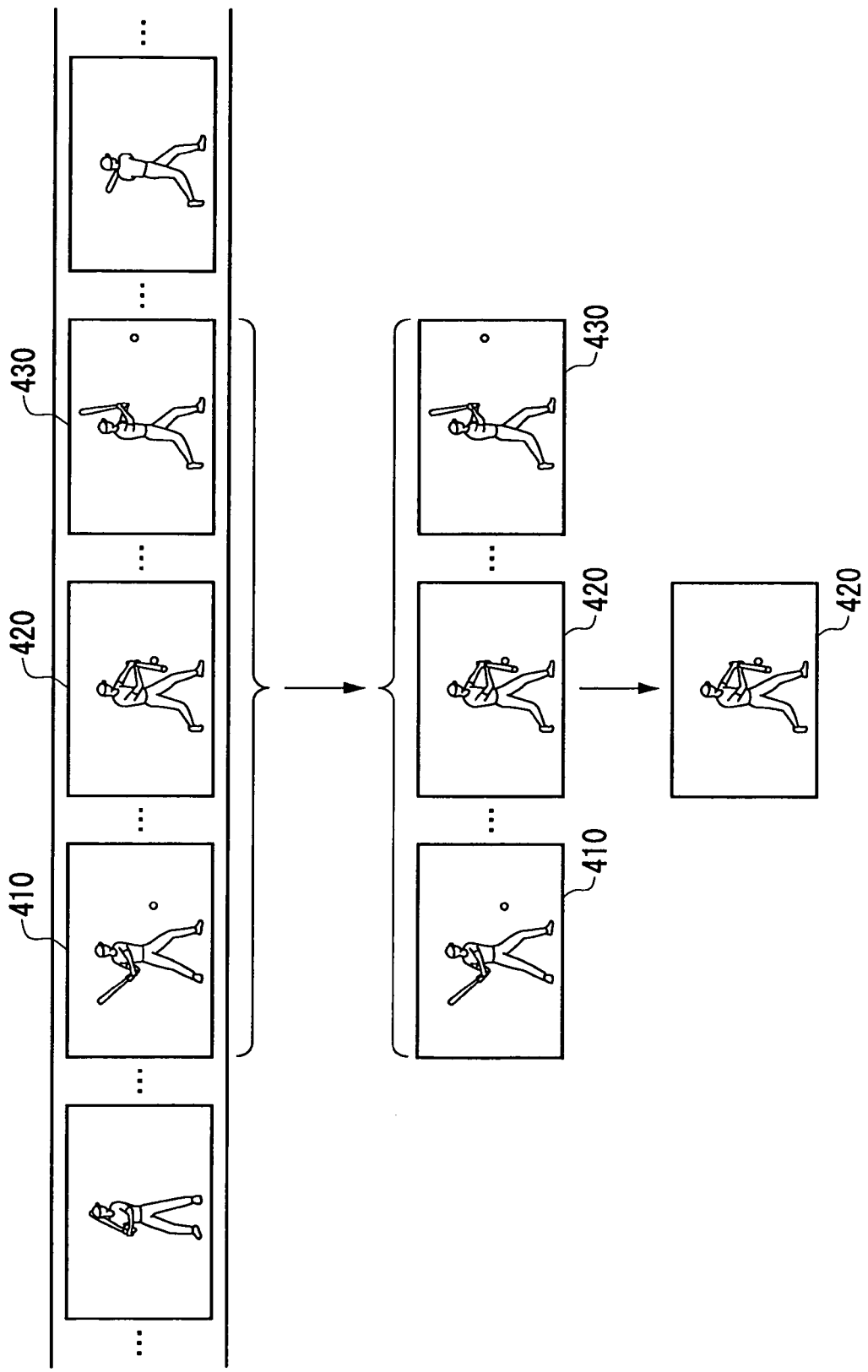
FIG. 4 is a view showing an extraction method of a representative image by a representative image extracting section 50.

FIG. 4 is a view exemplary showing an extraction method of a representative image by the representative image extracting section 50. The representative image extracting section 50 extracts moving-image constituting images included in a predetermined time range centered on the timing specified by the timing specifying section 40 as a representative image. For example, it is considered that the timing specified by the timing specifying section 40 is a timing corresponding to a moving-image constituting image 420.

In this case, the representative image extracting section 50 extracts moving-image constituting images 410 to 430 as a representative image with a central focus on the moving-image constituting image 420 corresponding to the specified timing. Moreover, the representative image extracting section 50 may extract, as a representative image, moving-image constituting images included in a predetermined time range centered on a timing in which acceleration of an object is the largest.

For example, it is considered that the acceleration of ball included in the moving-image constituting images. In this case, the representative image extracting section 50 extracts, as a representative image, a moving-image constituting image taken in the timing specified by the timing specifying section 40, in which the acceleration of object is the largest. For example, when the acceleration of ball included in the moving-image constituting image 420 shows the largest acceleration among the moving-image constituting images, the moving-image constituting image 420 may be extracted as a representative image. Furthermore, the representative image extracting section 50 may extract, as a representative image, a plurality of moving-image constituting images included in a predetermined time range with a central focus on the moving-image constituting image 420, e.g., the moving-image constituting images 410 to 430.

According to the album creating apparatus 100 according to the present embodiment, a representative image can be automatically extracted with a central focus on a timing in which the acceleration of object included in moving-image constituting images of a moving image is the largest acceleration. In this way, it is possible to surely extract a representative image at a crucial moment when a change of a movement of an object included in moving-image constituting images seems to be rapid and precisely meet a request of a user.

Figure 5:
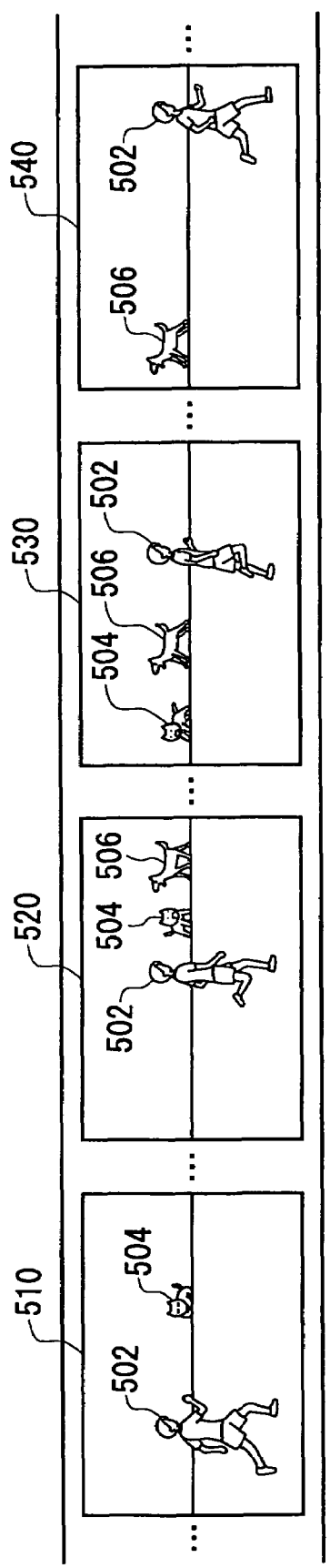
FIG. 5 is a view showing an extraction method of a representative image by a representative image extracting section 50.

FIG. 5 is a view exemplary showing an extraction method of a representative image by the representative image extracting section 50. First, the object extracting section 20 respectively extracts a plurality of objects included in a moving image. Subsequently, the object acceleration computing section 30 computes acceleration of each of the plurality of extracted objects. Then, the timing specifying section 40 specifies a timing in which acceleration of each of the extracted objects is larger than a predetermined reference.

For example, a FIG. 502, a cat 504, and a dog 506 are extracted from a moving image by the object extracting section 20. Then, the object acceleration computing section 30 computes acceleration for each of the FIG. 502, the cat 504, and the dog 506 in moving-image constituting images of the moving image. Furthermore, the timing specifying section 40 specifies a timing in which acceleration of each of the extracted FIG. 502, the extracted cat 504, and the extracted dog 506 is larger than a predetermined reference. Then, for each of the plurality of objects extracted from the object extracting section 20, the representative image extracting section 50 respectively extracts, as a representative image, moving-image constituting images included in a predetermined time range centered on the timing specified by the timing specifying section 40.

For example, it is considered that the timing specified by the timing specifying section 40 based on the acceleration of FIG. 502 is a timing corresponding to a moving-image constituting image 510. In this case, the representative image extracting section 50 extracts a plurality of moving-image constituting images included in a predetermined time range with a central focus on the moving-image constituting image 510, as a representative image of the FIG. 502. Moreover, the representative image extracting section 50 may extract only the moving-image constituting image 510 as a representative image of the FIG. 502.

Moreover, for example, it is considered that the timing specified by the timing specifying section 40 based on the acceleration of cat 504 is a timing corresponding to a moving-image constituting image 530. In this case, the representative image extracting section 50 extracts a plurality of moving-image constituting images included in a predetermined time range with a central focus on the moving-image constituting image 530, as a representative image of the cat 504. Moreover, the representative image extracting section 50 may extract only the moving-image constituting image 530 as a representative image of the cat 504.

Furthermore, a user oneself may select a representative image that the user wants to appreciate among representative images automatically extracted by the album creating apparatus 100. Then, the representative image selected by the user may be displayed on the output section 70 such as a display apparatus for a longer time than images except the representative image or be emphatically displayed by an enlargement process or the like.

According to the album creating apparatus 100 according to the present embodiment, it is possible to automatically extract a representative image for each of a plurality of objects included in a moving image. In this way, it is possible to easily select a representative image that a user oneself wants to appreciate among extracted representative images.

Moreover, the timing specifying section 40 specifies a timing in which acceleration of an object of which an area is the largest among objects included in moving-image constituting images is the largest. Then, the representative image extracting section 50 may extract, as a representative image, moving-image constituting images included in a predetermined time range centered on the timing specified by the timing specifying section 40.

For example, an object with the largest area is the figure 502 in the moving-image constituting images 510 to 540. Therefore, the timing specifying section 40 specifies a timing in which the acceleration of FIG. 502 is the largest. Then, when the timing in which the acceleration of FIG. 502 is the largest is, e.g., a timing corresponding to the moving-image constituting image 510, a plurality of moving-image constituting images included in a predetermined time range with a central focus on the moving-image constituting image 510 is respectively extracted as a representative image.

According to the album creating apparatus 100 according to the present embodiment, it is possible to automatically extract a representative image of an object of which an area is the largest among a plurality of objects included in a moving image. In this way, it is possible to appropriately extract a representative image that a user wants to appreciate rather than images except the representative image that the user wants to appreciate.

Figure 6:
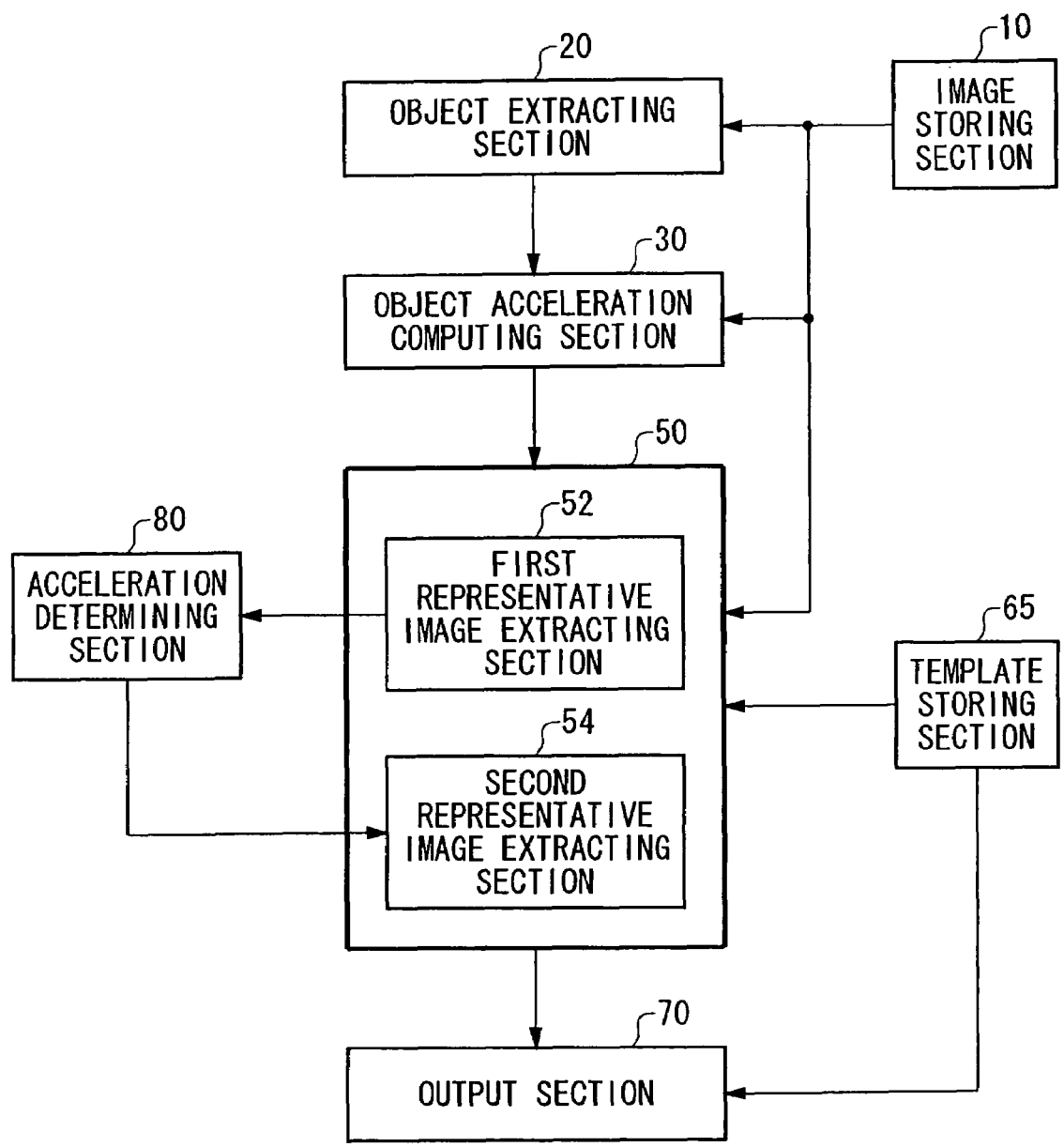
FIG. 6 is a block diagram showing a functional configuration of an album creating apparatus 100.

FIG. 6 is a view exemplary showing a functional configuration of an album creating apparatus 100 according to another embodiment of the present invention. The album creating apparatus 100 includes a template storing section 65 and an acceleration determining section 80. Moreover, a representative image extracting section 50 has a first representative image extracting section 52 and a second representative image extracting section 54. In addition, the album creating apparatus 100 according to the present embodiment may further include a part or the whole of a configuration and a function of the album creating apparatus 100 described in reference to FIGS. 1 to 5.

The image storing section 10 stores a plurality of candidate images. A candidate image may be either of a still image or a moving image. Then, the image storing section 10 may store a plurality of moving-image constituting images constituting a moving image when storing a moving image. The image storing section 10 supplies the candidate images to each section of the object extracting section 20, the object acceleration computing section 30, and the representative image extracting section 50 based on the control of each section. In addition, composition information that is information showing contents of a candidate image may be associated with each of the candidate images stored on the image storing section 10. For example, composition information may be information related to acceleration of an object included in a candidate image. The template storing section 65 stores a template for an output area for which an image arrangement position for arranging an image and composition information that is information for identifying a representative image to be arranged at the image arrangement position are predetermined. A template of an album page is an example of the template stored on the template storing section 65. Then, an album page may be a cover, spread pages, and one page of spread pages. Here, composition information may be acceleration range information showing a range of acceleration of an object included in a representative image and information showing acceleration of an object. Moreover, the template storing section 65 stores a template for an output area for which a first representative image arrangement position at which a first representative image should be arranged and a second representative image arrangement position at which a second representative image should be arranged are predetermined. Furthermore, the template storing section 65 may store a template for an output area for which the second representative image arrangement position and relative acceleration, which is acceleration of an object determined relatively to the acceleration of object included in the first representative image, are predetermined. The template storing section 65 supplies composition information associated with the image arrangement position included in the template to the first representative image extracting section 52 based on the control of the first representative image extracting section 52. Moreover, the template storing section 65 supplies the template of an album to the output section 70 based on the control of the output section 70.

In addition, an example of the first representative image includes a main image. A main image means an image intended to give a strong impression on a viewer in a page of an album. For example, a main image may be an image including a chief character in an album. Moreover, a main image may be an image emphasized most among a plurality of images arranged in a page. Specifically, a main image may be an image with the large size compared to the other images, an image arranged in a front face compared to the other images, or an image arranged at a most central position compared to the other images. Besides, a main image may be an image of which a periphery is emphasized with a frame or an image in which a visual effect is performed on a subject. Moreover, the second representative image in the present embodiment may be a sub image. Here, a sub image may be an image including a subject except a chief character in an album. Moreover, a sub image may be an image that is smaller than a main image and is arranged away from the center of image.

The representative image extracting section 50 may compare the acceleration of object included in a candidate image computed from the object acceleration computing section 30 and acceleration within an acceleration range of an object shown by acceleration range information associated with the image arrangement position included in the template stored on the template storing section 65, in order to extract a candidate image to be arranged at the image arrangement position as a representative image. That is, when the acceleration of object included in a candidate image is acceleration within an acceleration range shown by acceleration range information associated with the image arrangement position, the representative image extracting section 50 extracts the candidate image as a representative image. The representative image extracting section 50 supplies the extracted representative image to the output section 70.

The first representative image extracting section 52 included in the representative image extracting section 50 extracts the first representative image to be arranged at the first representative image arrangement position. Specifically, the first representative image extracting section 52 may extract a candidate image with which composition information identical with composition information associated with the first representative image arrangement position is associated, as the first representative image. Moreover, when acceleration of an object included in a candidate image, which is received from the object acceleration computing section 30, is acceleration within an acceleration range shown by acceleration range information associated with the image arrangement position, the first representative image extracting section 52 may extract the candidate image as the first representative image. The first representative image extracting section 52 supplies information related to the acceleration of object included in the extracted first representative image to the acceleration determining section 80. Moreover, the first representative image extracting section 52 supplies the extracted first representative image to the output section 70.

The acceleration determining section 80 determines acceleration of an object included in the second representative image to be arranged at the second representative image arrangement position according to information related to the acceleration of object included in the first representative image received from the first representative image extracting section 52. Moreover, the acceleration determining section 80 may determine acceleration of an object included in the second representative image to be arranged at the second representative image arrangement position, based on the acceleration of object included in the first representative image extracted from the first representative image extracting section 52 and the relative acceleration of object stored on the template storing section 65. The acceleration determining section 80 supplies information related to the determined acceleration of object included in the second representative image to the second representative image extracting section 54.

The second representative image extracting section 54 extracts the second representative image based on the information related to acceleration received from the acceleration determining section 80. For example, the second representative image extracting section 54 extracts, as the second representative image, a candidate image including an object having acceleration larger than the acceleration shown by the information related to acceleration received from the acceleration determining section 80. Moreover, the second representative image extracting section 54 may extract, as the second representative image, a candidate image including an object having acceleration smaller than the acceleration shown by the information related to acceleration received from the acceleration determining section 80. Moreover, the second representative image extracting section 54 may extract, as the second representative image, a candidate image including an object having the same acceleration as the acceleration shown by the information related to acceleration received from the acceleration determining section 80. Furthermore, the second representative image extracting section 54 may extract, as the second representative image, a candidate image including an object having a direction of acceleration same as or opposite to a direction of acceleration shown by the information related to the acceleration received from the acceleration determining section 80. The second representative image extracting section 54 supplies the extracted second representative image to the output section 70.

The output section 70 respectively lays out the first representative image received from the first representative image extracting section 52 and the second representative image received from the second representative image extracting section 54 at the first representative image arrangement position and the second representative image arrangement position included in the template received from the template storing section 65. Then, the output section 70 outputs the laid-out images from an album printing apparatus to make an album. Moreover, the output section 70 may display the laid-out images on a monitor or the like, or may record the laid-out images in a recording medium such as a DVD.

According to the album creating apparatus 100 according to the present embodiment, since an image arrangement frame in which an image included in a template of an albums is arranged is previously associated with information showing acceleration of an object to be included in the image arranged in the image arrangement frame, and a candidate image including an object having acceleration identical with the acceleration of object shown by the information can be automatically extracted as a representative image, it is possible to omit trouble and time selecting images that a user oneself wishes to see among many images when arranging the images in the template of album.

Figure 7:
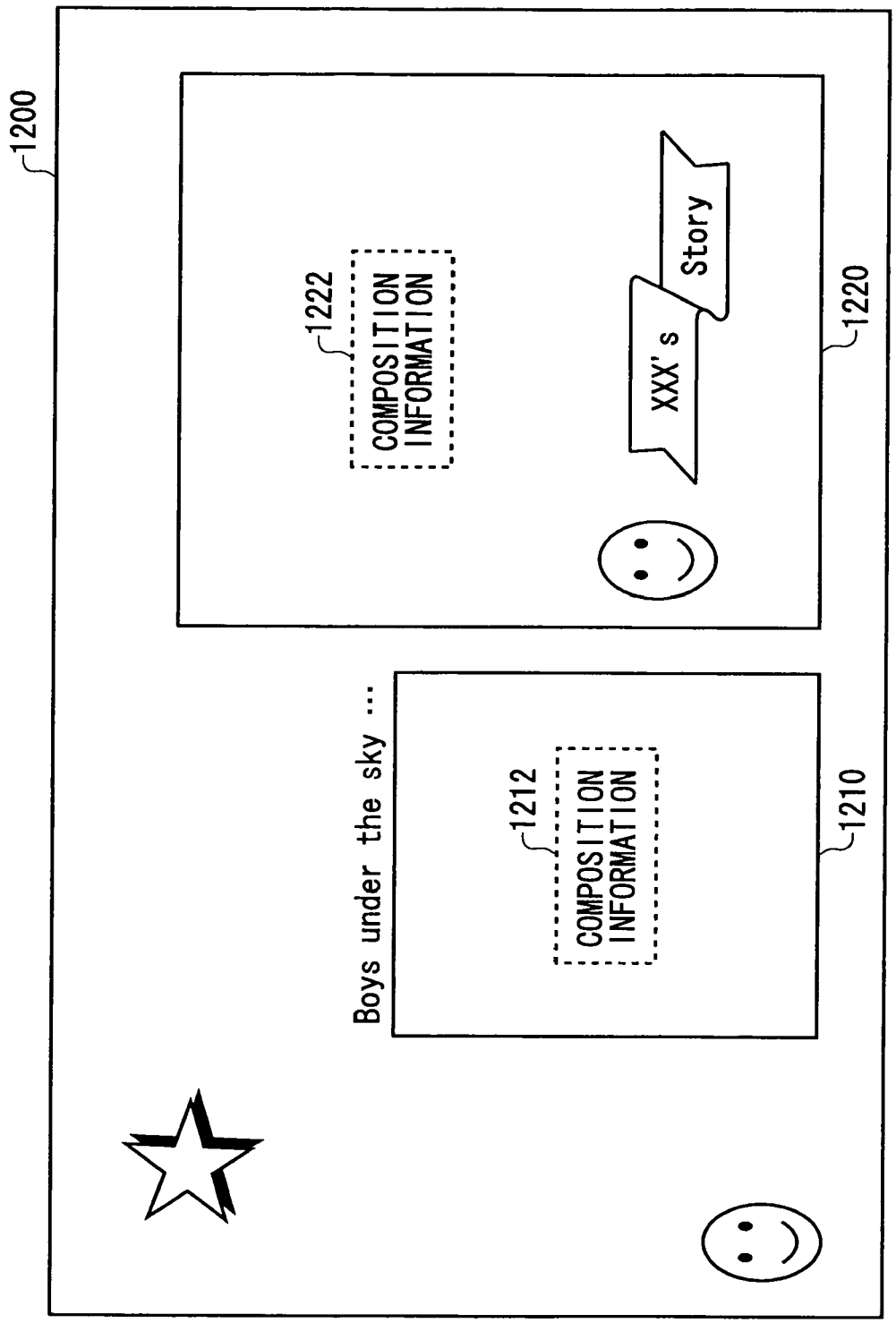
FIG. 7 is a view showing a template stored on a template storing section 65.

FIG. 7 is a view exemplary showing a template 1200 stored on the template storing section 65 according to the present embodiment. The template storing section 65 stores a template of an output area for which an image arrangement position and composition information of an image to be arranged at the image arrangement position are predetermined. In addition, the image arrangement position may correspond to an image arrangement frame in which images should be arranged. A plurality of image arrangement positions may be included in one output area. Moreover, the image arrangement frame corresponding to the image arrangement position may be a shape such as a generally circular shape, a generally polygonal shape, and a shape of an object included in the image. In addition, composition information may be an object name and a figure name included in an image, the cast of the figure (information that the figure is a chief character in the album according to a class of an album), information showing a position of the chief character in the image, a birthday of the figure included in the image, image capturing information such as a focusing distance, image capturing date and time, and an image capturing place when taking the image, and information showing a special feature of the image to be arranged at the image arrangement position such as a direction component of the image.

For example, an image arrangement frame 1210 and an image arrangement frame 1220 are included in the template 1200. Then, composition information 1212 is associated with the image arrangement frame 1210 and composition information 1222 is associated with the image arrangement frame 1220. In this case, the representative image extracting section 50 extracts, e.g., the composition information 1222 associated with the image arrangement frame 1220 to extract a candidate image having information identical with the composition information 1222. For example, when information related to acceleration of a predetermined object is associated with the composition information 1222, the representative image extracting section 50 extracts, as a representative image, a candidate image having information identical with the information related to acceleration of the object from the candidate images stored on the image storing section 10. Then, the image outputting section 70 lays out the representative image extracted from the representative image extracting section 50 in the image arrangement frame 1220 and outputs the laid-out image.

Figure 8:
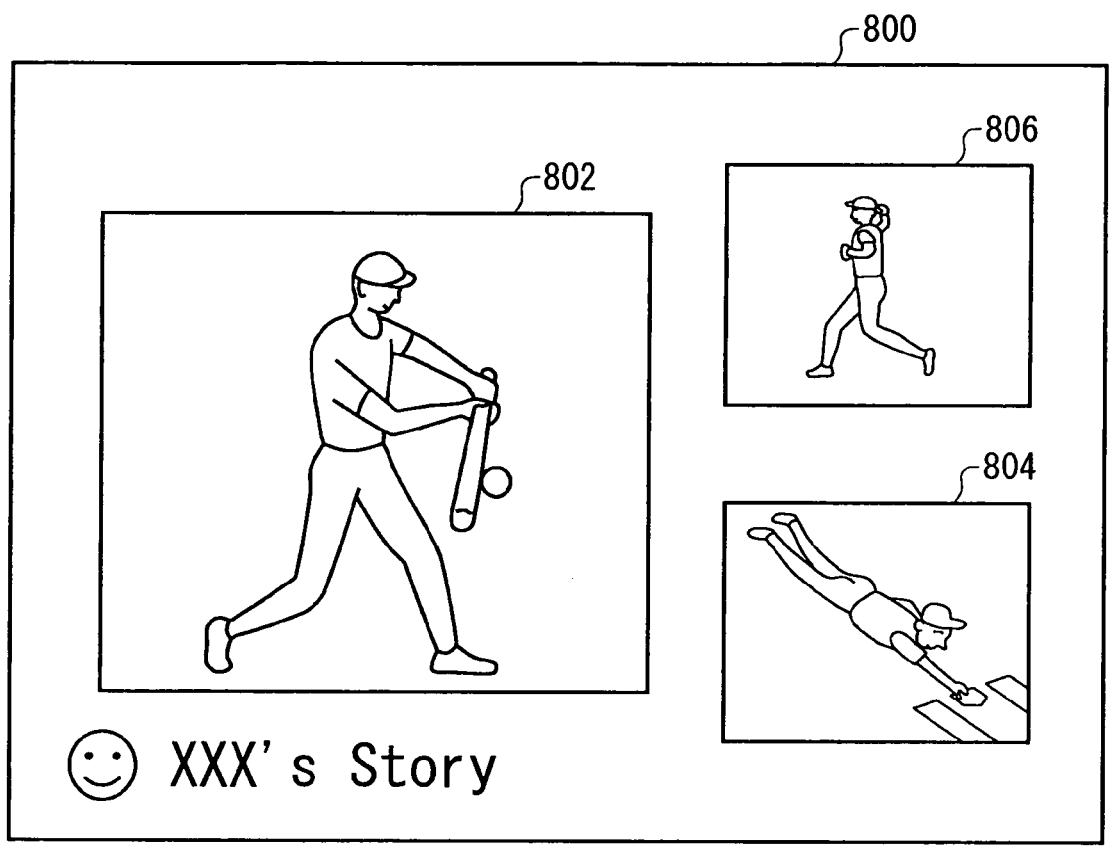
FIG. 8 is a view showing a process of an acceleration determining section 80.

FIG. 8 is a view exemplary showing a process of the acceleration determining section 80 according to the present embodiment. For example, it is considered that acceleration range information showing an acceleration range of an object included in a representative image to be arranged in a first image arrangement frame 802 in a template 800 is associated with the first image arrangement frame 802. In this case, the first representative image extracting section 52 receives information related to acceleration associated with the image arrangement frame 802 from the template storing section 65. Then, the first representative image extracting section 52 judges whether the acceleration of object included in a candidate image computed from the object acceleration computing section 30 is included in a range of acceleration shown by the acceleration range information associated with the image arrangement frame 802. Then, when it is judged that the acceleration of object included in a candidate image is included in the range of acceleration shown by the acceleration range information, the first representative image extracting section 52 extracts the candidate image as a first representative image. Then, the output section 70 receives the first representative image from the first representative image extracting section 52, and lays out the received image in the image arrangement frame 802 to output the laid-out image.

Moreover, the first representative image extracting section 52 supplies information related to the acceleration of object included in the first representative image to the acceleration determining section 80. The acceleration determining section 80 determines acceleration of objects included in representative images to be arranged in an image arrangement frame 804 and an image arrangement frame 806, based on the information related to the received acceleration. For example, the acceleration determining section 80 associates relative acceleration, which is acceleration of an object determined relatively to acceleration of the object included in the first representative image arranged in the image arrangement frame 802, with the image arrangement frame 804 and the image arrangement frame 806. Specifically; the acceleration determining section 80 associates acceleration not less than the acceleration of object included in the first representative image arranged in the image arrangement frame 802 with the image arrangement frame 804 and the image arrangement frame 806. Moreover, the acceleration determining section 80 may associate acceleration smaller than the acceleration of object included in the first representative image arranged in the image arrangement frame 802 with the image arrangement frame 804 and the image arrangement frame 806.

Based on information related to acceleration of objects included in the second representative images associated with the other image arrangement frames except the first image arrangement frame by the acceleration determining section 80, the second representative image extracting section 54 respectively extracts representative images to be arranged in the image arrangement frame 804 and the image arrangement frame 806. Then, the output section 70 arranges the second representative images extracted from the second representative image extracting section 54 in the image arrangement frame 804 and the image arrangement frame 806 to output these images.

Figure 9:
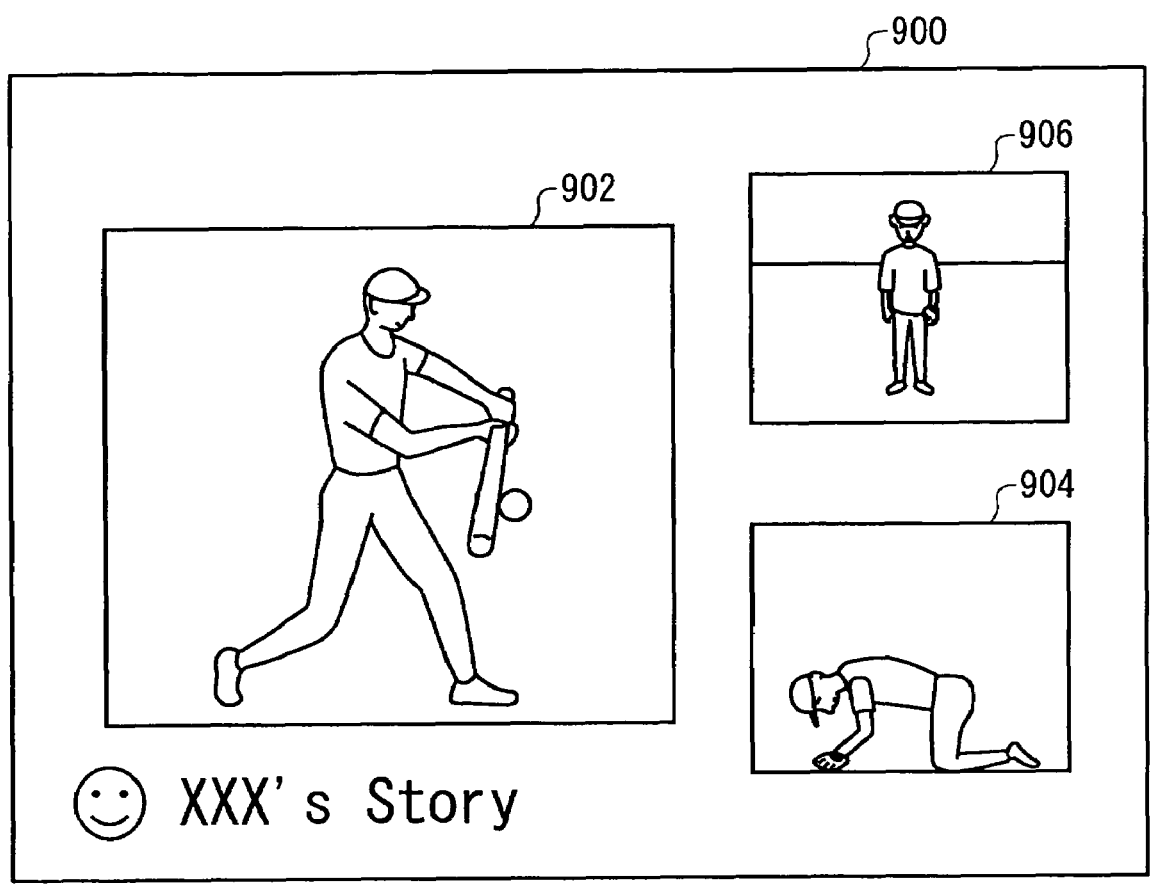
FIG. 9 is a view showing a process of an acceleration determining section 80.

FIG. 9 is a view exemplary showing a process of the acceleration determining section 80 according to the present embodiment. For example, it is considered that acceleration range information showing an acceleration range of an object included in a representative image to be arranged in a first image arrangement frame 902 in a template 900 is associated with the first image arrangement frame 902. In this case, the first representative image extracting section 52 receives information related to acceleration associated with the image arrangement frame 902 from the template storing section 65. Then, the first representative image extracting section 52 judges whether the acceleration of object included in a candidate image computed from the object acceleration computing section 30 is included in a range of acceleration shown by the acceleration range information associated with the image arrangement frame 902. Then, when it is judged that the acceleration of object included in a candidate image is included in the range of acceleration shown by the acceleration range information, the first representative image extracting section 52 extracts the candidate image as a first representative image. Then, the output section 70 receives the first representative image from the first representative image extracting section 52, and lays out the received image in the image arrangement frame 902 to output the laid-out image.

Moreover, the first representative image extracting section 52 supplies information related to the acceleration of object included in the first representative image to the acceleration determining section 80. The acceleration determining section 80 determines acceleration of objects included in representative images to be arranged in an image arrangement frame 904 and an image arrangement frame 906, based on the information related to the received acceleration. For example, the acceleration determining section 80 may associate information showing that acceleration of objects included in the representative images in the frames 904 and 906 is zero with the image arrangement frame 904 and the image arrangement frame 906, compared to the acceleration of object included in the first representative image arranged in the image arrangement frame 902.

Then, based on the information showing that acceleration of objects included in the second representative images is zero, which are associated with the other image arrangement frames except the first image arrangement frame 902 by the acceleration determining section 80, the second representative image extracting section 54 respectively extracts representative images to be arranged in the image arrangement frame 904 and the image arrangement frame 906. Then, the output section 70 arranges the second representative images extracted from the second representative image extracting section 54 in the image arrangement frame 904 and the image arrangement frame 906 to output these images.

Figure 10:
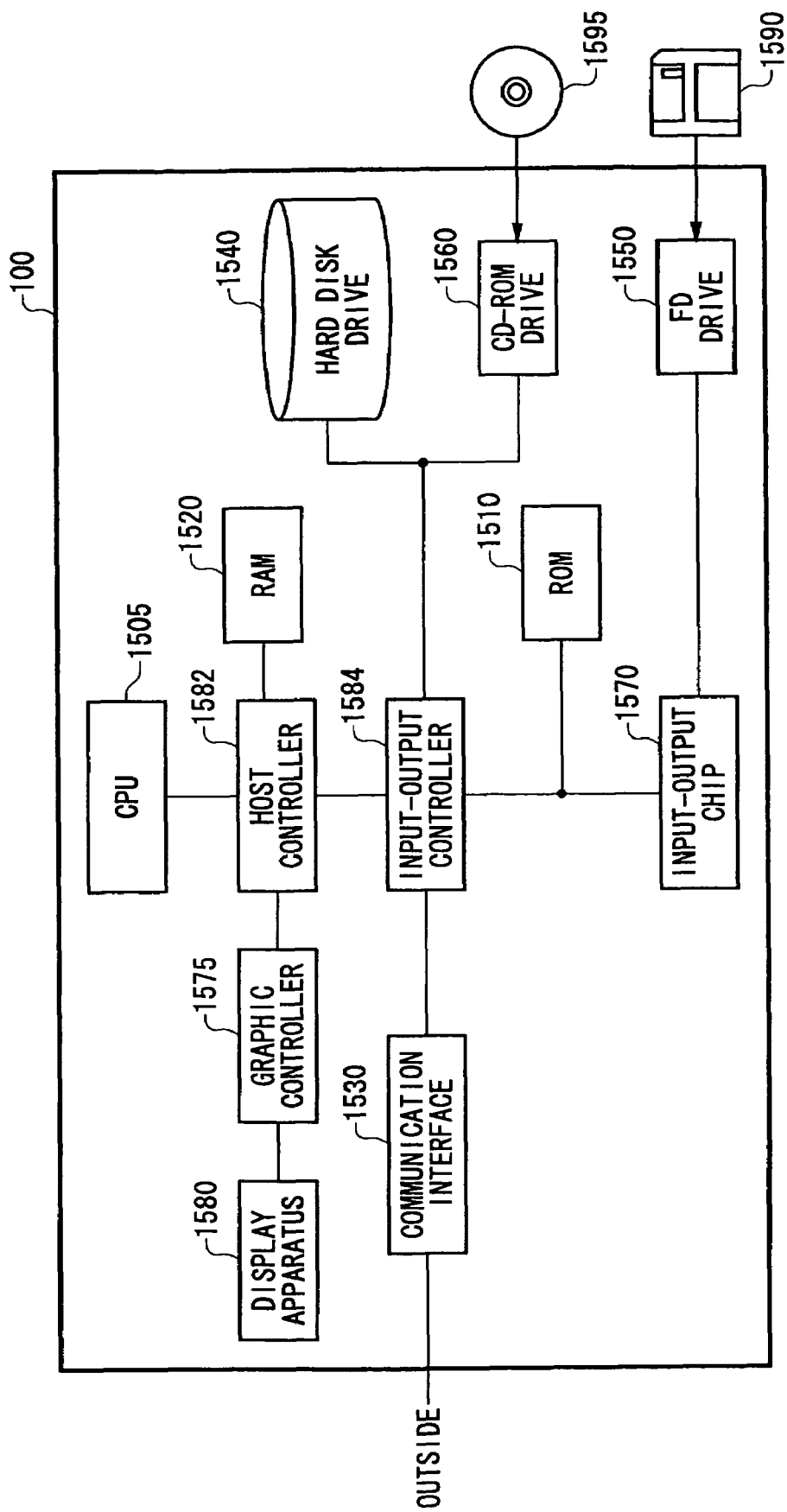
FIG. 10 is a block diagram showing a hardware configuration of an album creating apparatus 100.

FIG. 10 is a view exemplary showing a hardware configuration of the album creating apparatus 100 according to the present embodiment. The album creating apparatus 100 according to the present embodiment includes a CPU peripheral section having a CPU 1505, a RAM 1520, a graphic controller 1575, and a display apparatus 1580 that are connected to one another by a host controller 1582, an input-output section having a communication interface 1530, a hard disk drive 1540, and a CD-ROM drive 1560 that are connected to the host controller 1582 by an input-output controller 1584, and a legacy input-output section having a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the display apparatus 1580. Alternatively, the graphic controller 1575 may include therein the frame buffer storing the image data generated from the CPU 1505.

The input-output controller 1584 connects the host controller 1582 to the communication interface 1530, the hard disk drive 1540, and the CD-ROM drive 1560 that are a comparatively fast input-output apparatus. The communication interface 1530 communicates with the other apparatuses via a network. The hard disk drive 1540 stores a program and data to be used by the CPU 1505 in the album creating apparatus 100. The CD-ROM drive 1560 reads a program or data from a CD-ROM 1595, and provides the program or data to the hard disk drive 1540 via the RAM 1520.

Moreover, the ROM 1510, the flexible disk drive 1550, and the input-output chip 1570 that are a comparatively low-speed input-output apparatus are connected to the input-output controller 1584. The ROM 1510 stores a boot program to be executed during starting the album creating apparatus 100, a program dependent on hardware of the album creating apparatus 100, or the like. The flexible disk drive 1550 reads a program or data from a flexible disk 1590, and provides the program or data to the hard disk drive 1540 via the RAM 1520. The input-output chip 1570 connects the flexible disk drive 1550 to various kinds of input-output apparatuses via a parallel port, a serial port, a keyboard port, a mouse port, or the like.

An album creating program provided to the hard disk drive 1540 via the RAM 1520 is stored on a recording medium such as the flexible disk 1590, the CD-ROM 1595, or an IC card in order to be provided by a user. The album creating program is read from the recording medium, is installed in the hard disk drive 1540 in the album creating apparatus 100 via the RAM 1520, and is executed by the CPU 1505. The album creating program to be installed and executed in the album creating apparatus 100 works on the CPU 1505, and makes the album creating apparatus 100 function as the image storing section 10, the object extracting section 20, the object acceleration computing section 30, the timing specifying section 40, the representative image extracting section 50, the representative image storing section 60, the output section 70, the template storing section 65, the acceleration determining section 80, the first representative image extracting section 52, and the second representative image extracting section 54, described in FIGS. 1 to 9.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

As apparent from the above descriptions, according to the present invention, it is possible to realize an image extracting apparatus, an image extracting method, and an image extracting program for automatically extracting a moving-image constituting image at a crucial moment that a user wants to appreciate among a taken moving image.

What is claimed is:

1. An image extracting apparatus, provided with a processor and a storage under control of said processor, that extracts a candidate image to be output as a representative image from a plurality of candidate images, wherein said processor implements functional sections, comprising:

an object extracting section that extracts an object from a plurality of candidate images arranged in time series, each of the plurality of candidate images being a moving-image constituting image included in a moving image;

an object acceleration computing section that computes acceleration of each object of the plurality of candidate images relative to a background based on a change of position of the object extracted from said object extracting section in the plurality of candidate images arranged in time series;

a timing specifying section that specifies a timing at which the acceleration of the object extracted by said object extracting section from the moving-image constituting images relative to the background, which is computed by said object acceleration computing section, is larger than a predetermined reference acceleration based on a change of position in the plurality of moving-image constituting images included in the moving image; and a representative image extracting section that extracts, as a representative image, a moving-image constituting image in a time range including the timing specified by said timing specifying section.

2. The image extracting apparatus as claimed in claim 1, wherein
said representative image extracting section extracts a moving-image constituting image included in a predetermined time range centered on the timing specified by said timing specifying section as a representative image.

3. The image extracting apparatus as claimed in claim 2, wherein
said timing specifying section specifies a timing in which the acceleration computed from said object acceleration computing section is the largest, and
said representative image extracting section extracts, as a representative image, a moving-image constituting image included in a predetermined time range centered on the timing specified by said timing specifying section, in which the acceleration of the object is the largest.

4. The image extracting apparatus as claimed in claim 3, wherein said representative image extracting section extracts, as a representative image, a moving-image constituting image taken in the timing specified by said timing specifying section, in which the acceleration of the object is the largest.

5. The image extracting apparatus as claimed in claim 2, wherein
said object extracting section extracts a plurality of objects from the moving image,
said object acceleration computing section respectively computes acceleration of the plurality of objects extracted from said object extracting section,
said timing specifying section specifies a timing in which the acceleration computed from said object acceleration computing section is larger than a predetermined reference speed, for each of the plurality of objects extracted from said object extracting section, and
said representative image extracting section extracts a moving-image constituting image included in a predetermined time range centered on the timing specified by said timing specifying section as a representative image, for each of the plurality of objects extracted from said object extracting section.

6. The image extracting apparatus as claimed in claim 5, wherein
said timing specifying section specifies a timing in which acceleration of an object having a largest area in the moving-image constituting image is the largest among the plurality of objects extracted from said object extracting section, and
said representative image extracting section respectively extracts a moving-image constituting image included in the predetermined time range centered on the timing specified by said timing specifying section, in which the acceleration of the object having a largest area is the largest, as a representative image.

7. The image extracting apparatus as claimed in claim 1, wherein
the image extracting apparatus further comprises a template storing section that stores a template for an output area for which an image arrangement position and acceleration range information showing a range of acceleration of an object included in a representative image to be arranged in the image arrangement position are predetermined, and said representative image extracting section extracts, as a representative image, a candidate image of which acceleration of an object is within the range of acceleration of object shown by the acceleration range information associated with the image arrangement position included in the template stored on said template storing section.

8. The image extracting apparatus as claimed in claim 1, wherein
the image extracting apparatus further comprises a template storing section that stores a template for an output area for which a first representative image arrangement position at which a first representative image should be arranged and a second representative image arrangement position at which a second representative image should be arranged are predetermined, and
said representative image extracting section comprises:
a first representative image extracting section that extracts the first representative image to be arranged at the first representative image arrangement position;
an acceleration determining section that determines acceleration of an object included in the second representative image to be arranged at the second representative image arrangement position according to acceleration of an object included in the first representative image extracted from the first representative image extracting section; and
a second representative image extracting section that extracts the second representative image based on the acceleration of object determined by the acceleration determining section.

9. The image extracting apparatus as claimed in claim 8, wherein
said template storing section stores a template for an output area for which the second representative image arrangement position and relative acceleration that is acceleration of object determined relatively to the acceleration of object included in the first representative image are predetermined, and
the acceleration determining section determines the acceleration of object included in the second representative image to be arranged at the second representative image arrangement position based on the acceleration of object included in the first representative image extracted from the first representative image extracting section and the relative acceleration of object stored on said template storing section.

10. A method for controlling an image extracting apparatus to extract an image from a plurality of candidate images and output the extracted image as a representative image, comprising:
an object extracting step of extracting an object from a plurality of candidate images arranged in time series, each of the plurality of candidate images being a moving-image constituting image included in a moving image;
an object acceleration computing step of computing acceleration of each object of the plurality of candidate images relative to a background based on a change of position of the object extracted in said object extracting step in the plurality of candidate images arranged in time series;
a timing specifying step that specifies a timing at which the acceleration of the object extracted in said object extracting step from the moving-image constituting images relative to the background, which is computed in said object acceleration computing step, is larger than a predetermined reference acceleration based on a change of position in the plurality of moving-image constituting images included in the moving image;

a representative image extracting step of extracting, as a representative image, a moving-image constituting image in a time range including the timing specified in said timing specifying step; and a representative image outputting step of outputting the extracted representative image from the image extracting apparatus.

11. A computer-readable medium storing thereon a program for an image extracting apparatus that extracts a candidate image to be output as a representative image from a plurality of candidate images, the program making the image extracting apparatus function as:

an object extracting section that extracts an object from a plurality of candidate images arranged in time series, each of the plurality of candidate images being a moving-image constituting image included in a moving image;

an object acceleration computing section that computes acceleration of each object of the plurality of candidate images relative to a background based on a change of position of the object extracted from said object extracting section in the plurality of candidate images arranged in time series;

a timing specifying section that specifies a timing at which the acceleration of the object extracted by said object extracting section from the moving-image constituting images relative to the background, which is computed from said object acceleration computing section, is larger than a predetermined reference acceleration based on a change of position in the plurality of moving-image constituting images included in the moving image; and a representative image extracting section that extracts, as a representative image, a moving-image constituting image in a time range including the timing specified by said timing specifying section.

* * * * *